(12) United States Patent
Mukherjee et al.

(10) Patent No.: US 9,990,403 B2
(45) Date of Patent: Jun. 5, 2018

(54) SYSTEM AND A METHOD FOR REASONING AND RUNNING CONTINUOUS QUERIES OVER DATA STREAMS

(71) Applicant: Tata Consultancy Services Limited, Mumbai (IN)

(72) Inventors: Debnath Mukherjee, Kolkata (IN); Prateep Misra, Kolkata (IN); Snehasis Banerjee, Kolkata (IN)

(73) Assignee: Tata Consultancy Services Limited, Mumbai (IN)

( * ) Notice: Subject to any disclaimer, the term of this patent is extended or adjusted under 35 U.S.C. 154(b) by 602 days.

(21) Appl. No.: 14/387,540

(22) PCT Filed: Apr. 12, 2013

(86) PCT No.: PCT/IN2013/000246
§ 371 (c)(1),
(2) Date: Sep. 23, 2014

(87) PCT Pub. No.: WO2013/175495
PCT Pub. Date: Nov. 28, 2013

(65) Prior Publication Data
US 2015/0039648 A1    Feb. 5, 2015

(30) Foreign Application Priority Data
Apr. 12, 2012  (IN) .................. 1193/MUM/2012

(51) Int. Cl.
G06F 17/30    (2006.01)
G06N 5/04     (2006.01)
G06N 5/02     (2006.01)

(52) U.S. Cl.
CPC ....... *G06F 17/30516* (2013.01); *G06N 5/022* (2013.01); *G06N 5/04* (2013.01)

(58) Field of Classification Search
None
See application file for complete search history.

(56) References Cited

U.S. PATENT DOCUMENTS 5,434,860 A    7/1995  Riddle
6,085,224 A *  7/2000  Wagner .................. H04L 29/06
                                              709/203

(Continued)

FOREIGN PATENT DOCUMENTS

CN    200910152876    3/2010
KR    1020110016662   9/2012

OTHER PUBLICATIONS

Weishar et al., "Data/Knowledge Packets as a means of Supporting Sematic Heterogeneity in Multidatabase Systems", published in 1991, pp. 1-8.*

(Continued)

*Primary Examiner* — Son T Hoang
(74) *Attorney, Agent, or Firm* — Finnegan, Henderson, Farabow, Garrett & Dunner LLP

(57) ABSTRACT

Disclosed is a method and a system for stream reasoning a plurality of data streams. The system comprises a processor and a memory coupled to the processor. The processor is capable of executing a plurality of modules embodied on the memory. The plurality of modules comprises an event module and a application managed window module. The event module is configured to receive a data stream associated with an event from a stream reasoner application. The data stream provides factual information about the event. Further, the data stream comprises a request. The request may be an add request or a delete request. The application managed window module is configured to insert the request associated with the event or delete a prior request associated with the event from the memory based upon a type of the request.

18 Claims, 6 Drawing Sheets

(56) References Cited

U.S. PATENT DOCUMENTS

| | | | |
|---|---|---|---|
| 6,338,055 B1* | 1/2002 | Hagmann | G06F 17/30448 |
| 7,085,683 B2 | 8/2006 | Anderson et al. | |
| 7,818,313 B1* | 10/2010 | Tsimelzon | G06F 17/30545 |
| | | | 707/718 |
| 8,065,319 B2 | 11/2011 | Ding et al. | |
| 8,577,815 B2 | 11/2013 | Barajas et al. | |
| 8,661,014 B2 | 2/2014 | Chen et al. | |
| 8,751,420 B2 | 6/2014 | Hjelm et al. | |
| 2003/0191608 A1 | 10/2003 | Anderson et al. | |
| 2007/0185930 A1* | 8/2007 | Betz | H04L 67/02 |
| 2008/0005278 A1* | 1/2008 | Betz | G06F 17/3089 |
| | | | 709/219 |
| 2009/0006320 A1 | 1/2009 | Ding et al. | |
| 2009/0122808 A1* | 5/2009 | Sharif-Ahmadi | H04L 47/10 |
| | | | 370/458 |
| 2010/0318673 A1* | 12/2010 | Kemp, II | G06Q 40/04 |
| | | | 709/232 |
| 2011/0004863 A1* | 1/2011 | Feblowitz | G08G 1/04 |
| | | | 717/105 |
| 2011/0099136 A1 | 4/2011 | Barajas et al. | |
| 2012/0030220 A1 | 2/2012 | Edwards et al. | |
| 2012/0123850 A1* | 5/2012 | Chen | G06Q 10/10 |
| | | | 705/14.36 |
| 2013/0246315 A1* | 9/2013 | Joshi | G06N 5/04 |
| | | | 706/10 |
| 2013/0262366 A1 | 10/2013 | Hjelm et al. | |

OTHER PUBLICATIONS

Davide Francesco Barbieri, Daniele Braga, Stefano Ceri, Emanuele Della Valle, and Michael Grossniklaus, "Incremental Reasoning on Streams and Rich Background Knowledge", Springer-Verlag Berlin Heidelberg 2010, ESWC 2010, Part I, LNCS 6088, 2010 (15 pages).
Onkar Walavalkar, Anupam Joshi, Tim Finin, and Yelena Yesha, "Streaming Knowledge Bases", Department of Computer Science and Electrical Engineering, University of Maryland, Aug. 31, 2007 (16 pages).
International Search Report dated Dec. 2, 2013 in International Application No. PCT/IN2013/000246 (2 pages).

* cited by examiner

SYSTEM AND A METHOD FOR REASONING AND RUNNING CONTINUOUS QUERIES OVER DATA STREAMS

TECHNICAL FIELD

The present subject matter described herein, in general, relates to digital processing systems, and more particularly to a system and method for reasoning and running continuous queries over data streams.

BACKGROUND

With extensive deployment of electronic devices such as, sensors and computing devices around the globe, a large volume of data streams are being generated by these electronic devices. These data streams need to be collected and further required to be processed. Typically, the processing of the data streams from the electronic devices should be in real time so that immediate action can be taken.

There is a need for reasoning the data streams captured from the electronic devices to get actionable insights from the data streams. In addition to the data streams received from the electronic devices, the reasoning must also be performed on the other knowledge pertaining to the data streams. However, the knowledge may not be present at a single location.

Conventional systems tend to consider ontology files as the only source of knowledge. However in an enterprise environment, knowledge lies in different systems such as relational databases, flat files etc. Unfortunately, it is not feasible for the conventional systems to collect all the knowledge and consolidate at a single location to perform the reasoning.

The conventional systems are incapable of processing the data streams using effective reasoning techniques. Moreover, conventional systems rely on large continuous queries, thereby making an entire process of reasoning slow and inefficient.

Further, conventional systems only support time-based and count-based windows for the requests received by them. In time-based windows, triples in the stream are stored for a given length of time in the system. In count-based windows, a fixed number of triples of a data stream are stored in the system. However, in some situations, only the client application using the system knows what is the lifetime of a fact (triple) in the system.

SUMMARY

This summary is provided to introduce concepts related to systems and methods for reasoning and running queries over data streams and the concepts are further described below in the detailed description. This summary is not intended to identify essential features of the claimed subject matter nor is it intended for use in determining or limiting the scope of the claimed subject matter.

In one implementation, a stream reasoner is disclosed. The stream reasoner comprises a processor and a memory coupled to the processor for executing a plurality of modules in a memory. The plurality of modules comprises an event module and a stream managing module. The event module is configured to receive a data stream associated with an event from a stream reasoner application, wherein the data stream provides factual information about the event, and wherein the data stream comprises a request, and wherein a type of the request is one of an add request and a delete request. Further, the application managed window module is configured to insert or delete a prior request associated with the event from the memory based upon the type of the request.

In another implementation, a method for controlling a request in the stream reasoner is disclosed. The method includes receiving a data stream associated with an event from the stream reasoner application, wherein the data stream provides factual information about the event, and wherein the data stream comprises a request, and wherein a type of the request is one of an add request and a delete request. Further, the application managed window module is configured to add the request associated with the event or delete a prior request associated with the event from the memory based upon the type of the request.

In yet another implementation, a computer program product having embodied thereon a computer program for controlling a request in the stream reasoner is disclosed. The computer program product includes a program code for receiving a data stream associated with an event from the stream reasoner application, wherein the data stream provides factual information about the event, and wherein the data stream comprises a request. A type of the request is one of an add request and a delete request. Further, the computer program product includes a program code for adding the request associated with the event or deleting a prior request associated with the event from the memory based upon the type of the request.

BRIEF DESCRIPTION OF THE DRAWINGS

The detailed description is described with reference to the accompanying figures. In the figures, the left-most digit(s) of a reference number identifies the figure in which the reference number first appears. The same numbers are used throughout the drawings to refer like features and components.

DETAILED DESCRIPTION

Definitions

Figure 1:
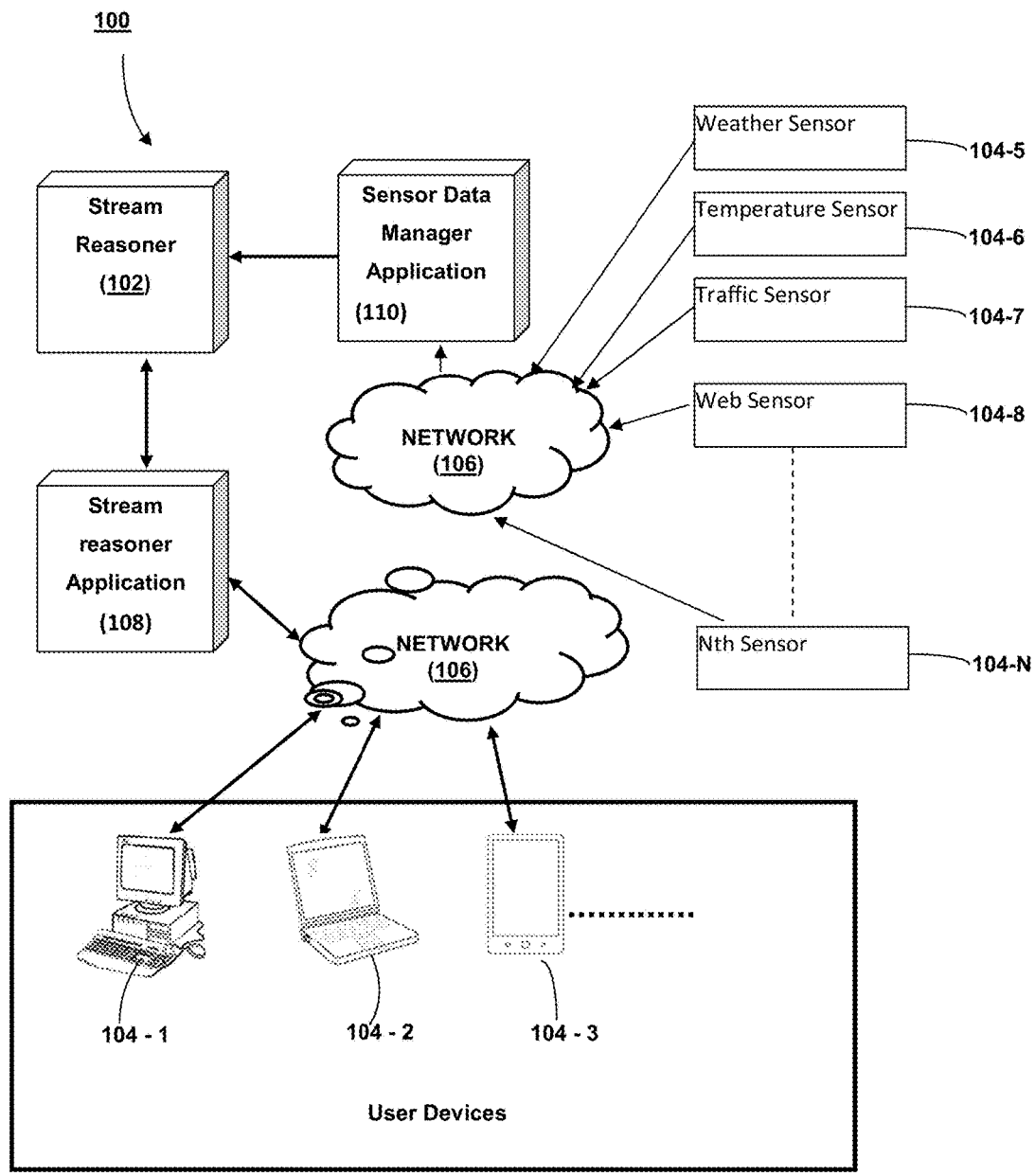
FIG. 1 illustrates a network implementation of a stream reasoner for reasoning and running queries over data streams, in accordance with an embodiment of the present subject matter.

Fact: Fact is a piece of information that is known to be true. In this context, facts are represented as triples:<subject, predicate, object> for example, <A has_last_name "Smith">

Data Stream: Data Stream is a time-ordered set of facts.

Ontology: Ontology in this context is a representation of knowledge that usually contains classes of objects/entities, relationship between classes and attributes of classes. Ontologies can be stored in RDF stores and files.

Reasoning: Reasoning in this context is an act of deriving or inferring additional knowledge from a set of given knowledge using techniques such as rules (rule-based reasoning), deduction (deductive reasoning), inductive reasoning, abductive reasoning etc.

Continuous queries: Continuous queries are pre-registered queries which are run when data streams (or events) arrive in the system. Continuous queries are used in real time analytics applications where specific patterns need to be detected based on the events arriving in the system. Based on the detected patterns, external systems need to be informed or alerts need to be sent etc. Continuous queries need to combine information from multiple data streams and from static knowledge sources to detect the patterns.

The present subject matter relates generally to digital processing systems, and more particularly to a system and a method for running continuous queries and reasoning on a plurality of data streams associated with a plurality of events. The data streams provide factual information about one or more events. The data streams may be received from an electronic device in form of knowledge packets.

It may be understood that each of the plurality of data streams may be first converted into Knowledge Packets (KP). The KPs may be organized as a set of triples. Further, the knowledge packet may indicate whether the KP is an add request or a delete request. When the stream reasoner receives the KP as an add request, the stream reasoner schedules the KP for processing. An add request is processed by inserting all the triples in the request for addition to a memory area of the stream reasoner. Then, reasoning and querying is done on the data stream. On the other hand, a delete request can be processed by the stream reasoner either immediately or later as will be explained in greater detail below.

It may be understood that the data streams may be stored along with background knowledge obtained from a plurality of heterogeneous knowledge sources. The heterogeneous knowledge sources comprise RDF store, relational database, ontology files, and other knowledge sources. The background knowledge provides additional information about the events, thereby providing a holistic view of the event. The data streams and the background knowledge are stored together in a memory area such as, a Random Access Memory (RAM) of the stream reasoner. The data streams and the background knowledge may be reasoned using a set of rules to derive a logical reasoning about the event. Subsequently, the data streams, the logical reasoning, and the background knowledge may be queried. A result of the execution of the queries is combined with the facts from the plurality of heterogeneous knowledge sources to detect patterns. The queries include, but are not limited to, continuous SPARQL queries.

Further, in order to improve a performance of the stream reasoner, in one implementation, the queries may be segmented into query fragments. The query fragments are executed in one of a parallel mode or a sequential mode. After the execution of the query fragments, the results of the query fragments are combined together to get a final result.

Generally, when a single query is run, taking into consideration impact of all events, the query becomes very large and takes more time for execution. Therefore, in one embodiment, the query may be segmented into a plurality of incremental queries. The incremental query assesses impact of a single event at a time. For example, if there are two events A and B, the impact of these events on the application is to be assessed in two separate queries for better and faster execution.

While aspects of described system and method for reasoning and running continuous queries on the plurality of data streams may be implemented in any number of different computing systems, environments, and/or configurations, the embodiments are described in the context of the following exemplary system.

Referring now to FIG. 1, a network implementation 100 of a stream reasoner 102 for reasoning and running queries on a plurality of data streams is illustrated, in accordance with an embodiment of the present subject matter. The network implementation 100 comprises a stream reasoner 102, electronic devices 104, a network 106, intermediate applications such as, a stream reasoner application 108 and an sensor data manager application 110. The electronic devices 104 are communicatively coupled to the stream reasoner 102 through the network 106 via the intermediate applications. The electronic devices 104 may include user devices and sensors. The user devices may communicate with the stream reasoner 102 via the stream reasoner application 108. The stream reasoner application 108 is an intermediate application which lies between the user devices and the stream reasoner 102. The stream reasoner application 108 converts the data streams coming from the user devices into knowledge packets. The data streams in form of knowledge packets are organized as triples and are shared with the stream reasoner 102.

On the other hand, the sensors may communicate with the stream reasoner 102 via the sensor data manager application 110. The sensors may include weather sensors, temperature sensors, traffic sensors, web sensors, and the like. The sensors may send raw data to the sensor data manager application 110. The sensor data manager application 110 converts the raw data received from the sensors into knowledge packets (set of triples). The data streams in form of knowledge packets may be shared with the stream reasoner 102 by the sensor data manager application 110.

It may be understood that the data stream provides factual information about the event. The data streams may converted to knowledge packets such as RDF format that is understood by the stream reasoner 102. For structured data streams that follow some open standards, the conversion to knowledge packets is easy. For semi structured data streams, the conversion to knowledge packets may be done by relevant keyword based match. The keywords can be manually tagged or learned over time by analyzing past data. For unstructured/raw data streams, some training is done at first by tagging what the text conveys. Models can be learnt by applying machine learning to classify the texts. One way to understand the unstructured data streams is to use natural language processing and information extraction techniques. Knowledge packet is a set of triples that carry some knowledge in unison. Knowledge packets as a communication medium disallows any partial entry of knowledge into the stream reasoner 102.

After receiving the knowledge packets from the intermediate applications, the stream reasoner 102 may determine whether the knowledge packet may indicate whether the KP is an add request or a delete request. When the stream reasoner 102 receives the KP as an add request, the stream reasoner 102 schedules the KP for processing. An add request is processed by inserting all the triples in the request for addition to a memory area of the stream reasoner 102. Then, reasoning and querying is done on the data stream. On the other hand, a delete request can be processed by the stream reasoner 102 either immediately or later as will be explained in greater detail below.

Although the present subject matter is explained considering that the stream reasoner 102 is implemented as on a server, it may be understood that the stream reasoner 102 may also be implemented in a variety of computing systems, such as a laptop computer, a desktop computer, a notebook, a workstation, a mainframe computer, a server, a network server, and the like. In an embodiment, the stream reasoner 102 can be hosted on Platform-as-a-Service (PAAS) platforms such as Real-Time Integrated Platform for Services and Analytics (RIPSAC), which has been disclosed in Patent Applications 2651/MUM/2011 and PCT/IN2012/000623 titled "A Computing Platform for Development and Deployment of Sensor Data Based Applications and Services". In such a scenario, the input to the stream reasoner 102 will be sensor data collected by the Sensor Observation Service in the RIPSAC and then converted to knowledge packets, while the output can also be used by other applications hosted on the RIPSAC. Otherwise, the sensor data from various sensor data sources can be fed to the stream reasoner 102 as knowledge packets, and the results from the stream reasoner 102 are sent to the Sensor Observation Service of RIPSAC platform.

It will be understood that the stream reasoner 102 may be accessed by multiple users through one or more electronic devices 104-1, 104-2 . . . 104-N, collectively referred to as electronic device 104 hereinafter, or applications residing on the electronic devices 104. Examples of the electronic devices 104 may include, but are not limited to, a portable computer, a personal digital assistant, a handheld device, and a workstation, a traffic signal sensors, an RFID tag, weather sensors, temperature sensors, web sensors, and the like. The electronic devices 104 are communicatively coupled to the stream reasoner 102 through the network 106 via the intermediate applications as explained above.

In one implementation, the network 106 may be a wireless network, a wired network or a combination thereof. The network 106 can be implemented as one of the different types of networks, such as intranet, local area network (LAN), wide area network (WAN), the internet, and the like. The network 106 may either be a dedicated network or a shared network. The shared network represents an association of the different types of networks that use a variety of protocols, for example, Hypertext Transfer Protocol (HTTP), Transmission Control Protocol/Internet Protocol (TCP/IP), Wireless Application Protocol (WAP), and the like, to communicate with one another. Further the network 106 may include a variety of network devices, including routers, bridges, servers, computing devices, storage devices, and the like.

Figure 2:
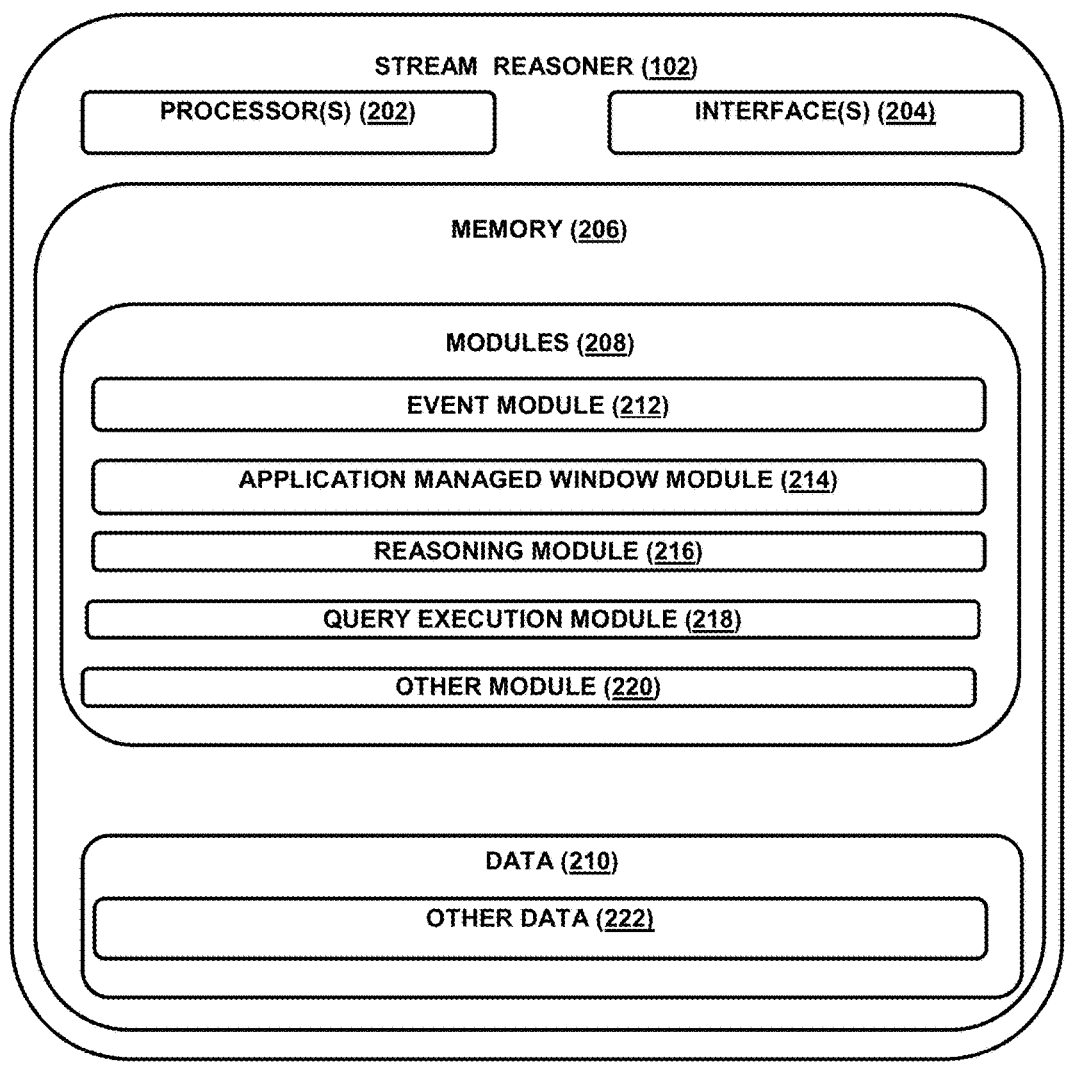
FIG. 2 illustrates the stream reasoner, in accordance with an embodiment of the present subject matter.

Referring now to FIG. 2, the stream reasoner 102 is illustrated in accordance with an embodiment of the present subject matter. In one embodiment, the stream reasoner 102 may include at least one processor 202, an input/output (I/O) interface 204, and a memory 206. The at least one processor 202 may be implemented as one or more microprocessors, microcomputers, microcontrollers, digital signal processors, central processing units, state machines, logic circuitries, and/or any devices that manipulate signals based on operational instructions. Among other capabilities, the at least one processor 202 is configured to fetch and execute computer-readable instructions stored in the memory 206.

The I/O interface 204 may include a variety of software and hardware interfaces, for example, a web interface, a graphical user interface, and the like. The I/O interface 204 may allow the stream reasoner 102 to interact with a user directly or through the electronic devices 104. Further, the I/O interface 204 may enable the stream reasoner 102 to communicate with other computing devices, such as web servers and external data servers (not shown). The I/O interface 204 can facilitate multiple communications within a wide variety of networks and protocol types, including wired networks, for example, LAN, cable, etc., and wireless networks, such as WLAN, cellular, or satellite. The I/O interface 204 may include one or more ports for connecting a number of devices to one another or to another server.

The memory 206 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. The memory 206 may include modules 208 and data 210.

The modules 208 include routines, programs, objects, components, data structures, etc., which perform particular tasks or implement particular abstract data types. In one implementation, the modules 208 may include an event module 212, a stream managing module 214, a reasoning module 216, a query execution module 218, and other modules 220. The other modules 220 may include programs or coded instructions that supplement applications and functions of the stream reasoner 102.

The data 210, amongst other things, serves as a repository for storing data processed, received, and generated by one or more of the modules 208. The data 210 may also include other data 222. The other data 222 may include data generated as a result of the execution of one or more modules in the other modules 220.

Figure 3:
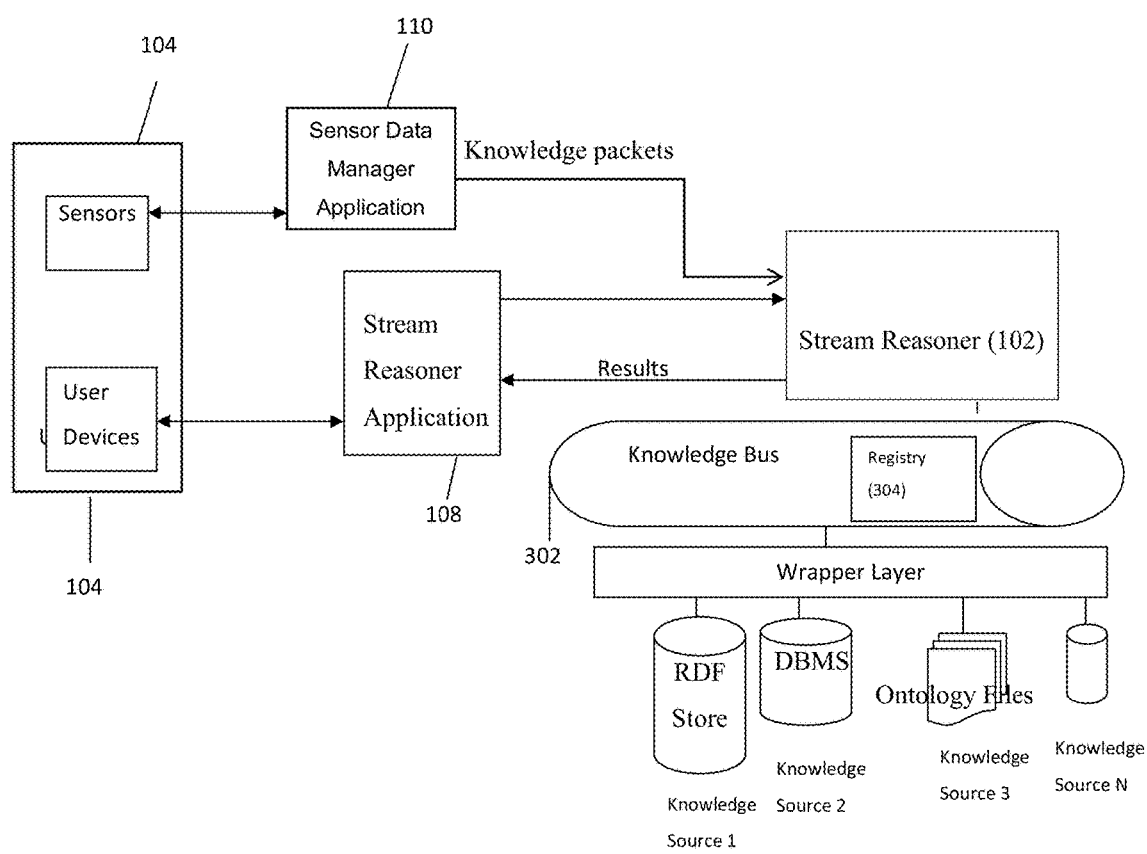
FIG. 3 illustrates an operational environment of the stream reasoner, in accordance with an embodiment of the present subject matter.

The working of each components of the stream reasoner 102 (shown in FIG. 2) may be explained in conjunction with FIG. 3.

Referring to FIG. 3, a block diagram illustrating an operational environment of the stream reasoner 102 is shown, in accordance with an embodiment of the present subject matter. The electronic devices, such as the user devices and the sensors may capture data streams pertaining to one or more events. The data streams, as known in the art, are unbounded sequences of time-varying factual data elements. Further, as mentioned above, the data streams may occur for a variety of events captured by the electronic devices, such as the user devices and the sensors. The data streams captured by the electronic devices may in unstructured form. Therefore, the data streams may be converted into Knowledge Packets (KPs) by the intermediate applications, such the stream reasoner application 108 and the sensor data manager application 110. The KPs, as known in the art, may be arranged in a set of triples. Each triple may contain a subject, an object, and a predicate. The intermediate applications may forward the data streams, in the form of KPs, to the stream reasoner 102. Similarly, the stream reasoner 102 may receives data streams from the electronic devices 104.

The event module 212 of the stream reasoner 102 receives the data streams, in form of KPs, from the intermediate applications, such the sensor data manager application 110 and the stream reasoner application 108. Each data stream, received by the event module 212, comprises a request. The request is one of an add request and a delete request. In case of the add request, the intermediate application requests the stream reasoner 102 to add the request. On the other hand, in case of the delete request, the intermediate application requests the stream reasoner 102 to delete a previously sent or a prior request associated with the event. This function of adding or deleting the request is performed by the application managed window module 214 of the stream reasoner 102.

Specifically, in one embodiment, the intermediate application may indicate the application managed window module 214 that whether the KP is an add request or a delete request. When the application managed window module 214 receives an add request, the application managed window module 214 schedules the KP for processing. The application managed window module 214 processes an add request by inserting all the triples in the request for addition to the memory 206 of the stream reasoner 102. On the other hand, in case of a delete request, the application managed window module 214 may process the delete in two methods. In a first method, the application managed window module 214 may delete the knowledge packet immediately from the memory area. Deleting the knowledge packet may cause some other derived facts to be deleted. The first method may be used when an immediate action needs to be taken on the delete request. In a second method, the application managed window module 214 may schedule the knowledge packet for deletion from memory 206. In the second method, there may be some delay in the deletion of the delete request, however, the processing of all KPs happens in their order of arrival in the stream reasoner 102.

It may be understood that since the data streams are infinite, the stream reasoner 102 cannot keep all elements of the data streams in a memory. Therefore, the application managed window module 214 manages the incoming requests by determining a type of the request, i.e., whether the request is an add request or a delete request. It may be understood that an expiration of the request is dependent on at least one of time, count, and the type of request. In other words, the application managed window module 214 controls a lifetime of a data stream present in the stream reasoner 102. In addition to application managed window, other window modes such as time based and count based windows are supported.

In one example, the function of the application managed window module 214 may be explained in context of an ad-hoc ride sharing application where data streams corresponding to requirements of ride givers and ride takers are sent to the stream reasoner 102. It may be understood that in the ad-hoc ride sharing application, a request for a ride must remain in the stream reasoner 102 until the ride giver/taker decides to cancel his/her ride or finishes his/her ride. It can be seen that the ride giver's request can't be stored in a time-based or count-based window as duration of a request will vary. Therefore, the application managed window module 214 manages the requests coming to the stream reasoner 102 by adding or deleting the request based upon a type of the request. There is also a provision for determining an expiry period of the request. In one example, windows managed by the application managed window module 214 are depicted by following diagram:
Initial state of user window:

| T1 | T2 | T3 | T4 |
|----|----|----|----|

After adding a request:

| T5 | T6 |
|----|----|

The state of window becomes:

| T1 | T2 | T3 | T4 | T5 | T6 | T7 |
|----|----|----|----|----|----|----|

(Here T7 is an entailment due to insertion of T5 and T6)
After a delete request:

| T5 | T6 |
|----|----|

The state of the window becomes:

| T1 | T2 | T3 | T4 |
|----|----|----|----|

Further, in another embodiment of the invention, the stream reasoner 102 does not process just one triple at a time, but multiple triples at a time. This is a requirement for many practical applications like the ad-hoc ride sharing application.

After receiving the data streams in the form of knowledge packets, stream reasoner 102 finds additional sources to determine background knowledge about the events. Specifically, the event module 212 configures the additional sources such as, heterogeneous knowledge sources for background knowledge associated with the events. The heterogeneous knowledge sources 304 may include, but not limited to, a rdf store, a relational database, an ontology file, flat files, and other knowledge sources. The background knowledge provides additional factual information about the events. The background knowledge is static information and does not change frequently. Knowledge about streets, points of interest, and its nearby locations along with static data about stakeholders is stored in a structured format.

In one example, the event module 212 uses a knowledge bus to identify the additional sources that may provide background knowledge relevant to the events.

The knowledge bus 302 is proposed wherein data is spread across several locations. The knowledge bus 302 is a conduit for data that is transferred between locations. The characteristics of the data is mentioned in a registry 304 accessible to all locations. One of the ways in which the registry can be stored is as follows:

```
<registry_entry>
<location_id>location id</location_id>
<location_access_info> Access Information </location_access_info>
<knowledge> subject predicate object </knowledge>
</registry_entry>
```

Location_id is unique across all locations where knowledge resides. An example of a location_id is a URI, IP address, and the like.

Location_access_info specifies information about how to access background knowledge at that location. Since different knowledge sources may support different methods to access knowledge such as "RDBMS", "FILE", "RDF Store" etc, the access information could be different across locations. The different knowledge sources transfer knowledge in the triple format, not in the native format—for this some wrapper may be present at the different locations.

Knowledge specifies what the different knowledge triples present at the location are. Subject, predicate, object specifies the knowledge content at the location. Any of the subject predicate or object can be unspecified. A <? hasName ?> specifies that all knowledge about names of individuals is present at the location. Further, <? hasFirstName "John"> specifies that knowledge about IRIs of individuals who have first name "John" is present at the location. Furthermore, <http://prefix/John ? ?> specifies that all knowledge about the entity whose IRI is http://prefix/John is present at the location.

When the stream reasoner 102 comes across a rule or query that requires information about John, the event module 212 searches the registry and sends a request to a remote location to transfer the background knowledge about "John" to the stream reasoner 102. Note that multiple knowledge sources may contain information about "John", so the event module 212 may use transfer cost (i.e. communication cost) based choice about which location to access—most commonly it is the nearest location. All knowledge is not present at all locations—only required pieces of knowledge (which are mentioned in rules or queries) are loaded at the stream reasoner 102. The stream reasoner 102 registers a listener at the remote location to receive updates to the knowledge and keep the local knowledge consistent.

The stream reasoner 102 may choose to do the knowledge transfer at run-time if the exact parameters for the remote knowledge access are unknown at compile time and the information is potentially very large. For example if the query or rule has the following pattern:
?var hasAddress ?addr, then runtime knowledge loading may be preferred. Further, at compile time, the stream reasoner 102 would have to fetch all addresses, but at runtime '?var' may be bound, so only one triple containing the address of ?var would have to be retrieved. Once the knowledge is transferred, the stream reasoner 102 may choose to keep it or evict it based on an eviction policy.

Therefore, it may be understood that the event module 212 may configure additional sources of knowledge based upon requirements of the reasoning module 216 and the query execution module 218. The event module 212 may store the data streams and the background knowledge obtained from heterogeneous knowledge sources in the memory 206 of the stream reasoner 102.

Subsequently, the reasoning module 216 may provide a reasoning about the event based upon the data stream and the background knowledge corresponding to the data stream. The reasoning module 216 may process the data stream using a combination of a reasoning technique. The reasoning module may provide the reasoning based upon one or more reasoning techniques, including but not limited to, deductive reasoning, rule-based reasoning, and inductive reasoning, and abductive reasoning and logical reasoning.

Subsequently, the query execution module 218 may receive queries for, the data stream, and the background knowledge. In one embodiment, the queries may be in a form of query fragments. In another embodiment, the queries may be queries which are not broken into fragments. If the queries are in the form of query fragments, the query execution module 218 may execute the query fragments on the output of the reasoning upon the data stream, and the background knowledge. The queries may include but not limited to SPARQL queries. Further, in the present embodiment, the query execution module 218 may either execute the query fragments in one of a parallel mode or in a sequential mode. In parallel mode, the query execution module 218 may run the query fragments in parallel, whereas in the sequential mode of execution, the query execution module 214 may run the query fragments in sequence. After execution of the query fragments, different fragment results are combined together to produce the final result. The final result is based on the summation of result of execution of query fragments.

Further, if the queries are continuous, then the query execution module 218 may receive incremental queries. As known, continuous queries used for various applications may become large if all possible events are considered in a single query. Accordingly, the query execution module 214 processes the incremental queries. In one example, the electronic device 104 may be affected by events A and B, then instead of writing a continuous query considering impact of both events A and B; two separate incremental queries QA and QB may be generated. The incremental queries QA and QB may be invoked when events A and B arrive in the stream reasoner 102. The incremental queries QA and QB may consider the impact of events A and B respectively and separately. The results are communicated to the electronic device which incrementally updates its state. In order to support incremental queries, the stream reasoner 102 supports parameterized queries, so that the same query can be run multiple times with different parameter values. For example, if the original query Q for the ad-hoc ride sharing application is:

```
Select ?rideGiver, ?rideTaker where { ?rideGiver hasRoute ?route.
?route has Segment ?seg1. ?route hasSegment ?seg2. ?rideTaker
hasStartPoint ?startPoint. ?startPoint on ?seg1. ?rideTaker hasEndPoint
?endPoint. ?endPoint on ?seg2.}
```

Then the query Q can be broken into two incremental queries: the rideGiver incremental query and the rideTaker incremental query (Note that the rideGiver event and rideTaker events are the two events that affect the original query Q). The ride giver incremental query is shown below as an example:

```
Select ?rideTaker where { (?1) hasRoute ?route. ?route hasSegment
?seg1. ?route hasSegment ?seg2. ?rideTaker hasStartPoint ?startPoint.
?startPoint on ?seg1. ?rideTaker hasEndPoint ?endPoint. ?endPoint
on ?seg2}.
```

Here, when a ride giver arrives in the system, the parameter (?1) is replaced by the ride giver's identifier (also called IRI). The ride giver incremental query returns the set of ride takers who match the ride giver. Similarly there is a ride taker incremental query.

Therefore, it may be understood that the stream reasoner 102 may execute the queries in the manner described above. To support multiple knowledge sources, the query execution module 214 possesses the capability to query heterogeneous knowledge sources using different query APIs. Additionally, knowledge residing in different types of heterogeneous knowledge sources 304 can be transferred to the stream reasoner 102 so that querying and reasoning can occur on memory-resident facts. After running the queries, the results are sent to the electronic device 104.

Figure 4:
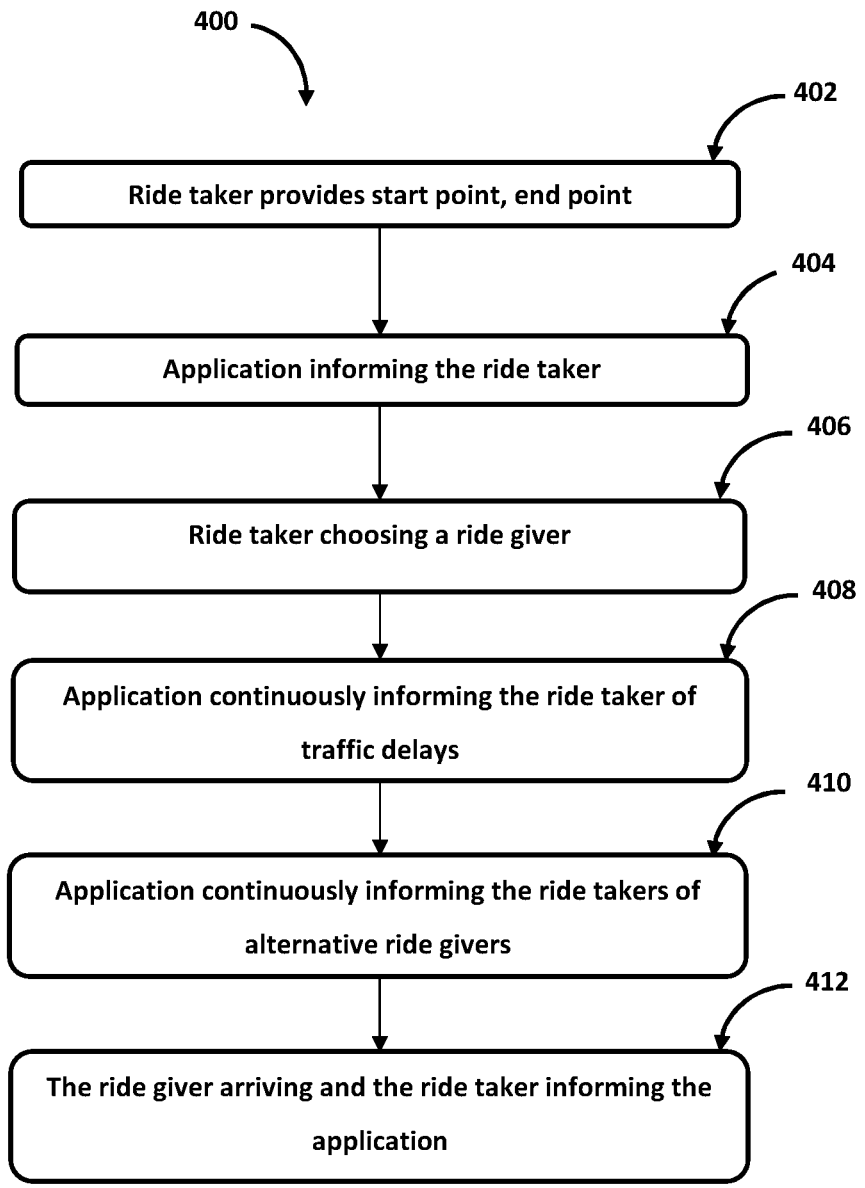
FIG. 4 is a flowchart of an ad-hoc ride sharing application from point of view of a ride taker, in accordance with an embodiment of the present subject matter.

A Working Example of the Stream Reasoner 102:

Referring now to FIG. 4, a method 400 for the ad-hoc ride sharing application from point of view of a ride taker is illustrated, in accordance with an embodiment of the present subject matter. The method 400 may be described in the general context of computer executable instructions. Generally, computer executable instructions can include routines, programs, objects, components, data structures, procedures, modules, functions, etc., that perform particular functions or implement particular abstract data types. The method 400 may also be practiced in a distributed computing environment where functions are performed by remote processing devices that are linked through a communications network. In a distributed computing environment, computer executable instructions may be located in both local and remote computer storage media, including memory storage devices.

The order in which the method 400 is described is not intended to be construed as a limitation, and any number of the described method blocks can be combined in any order to implement the method 400 or alternate methods. Additionally, individual blocks may be deleted from the method 400 without departing from the spirit and scope of the subject matter described herein. Furthermore, the method can be implemented in any suitable hardware, software, firmware, or combination thereof. However, for ease of explanation, in the embodiments described below, the method 400 may be considered to be implemented in the above described stream reasoner 102.

The ad-hoc ride sharing application is a mode of ride sharing. There are essentially two types of stakeholders: the ride taker who needs a ride, and the ride giver who offers a ride. So essential requirements for the ad-hoc ride application is to match the ride giver's route with the ride taker's start and destination locations. The application also matches the preferences using reasoning: for example if the ride taker is interested in a Sports Utility Vehicle (SUV) and the ride giver has a car of model X (which is of type SUV), the system will reason that since model X is an SUV, the ride taker is also interested in model X. The ad-hoc ride application is non-trivial application as real time data streams of traffic status and ride giver's positions have to be combined and alternate ride givers have to be maintained for each ride taker to ensure best possible experience for the ride taker. The stream reasoning seemed to be a good fit as there is a combination of streaming information (the ride giver requests, the ride taker requests, the traffic information) with background knowledge (the route segments in the city) and reasoning (about the preferences of the user) is needed.

At block 402, a ride taker provides start point, end point of ride, and optionally type of vehicle. At block 404, the ad-hoc ride application informs the ride taker of possible ride givers. At block 406, the ride taker chooses the ride giver and a handshake mechanism confirms that the ride giver is allocated for the ride taker. At block 408, the ad-hoc ride application continuously informs the ride takers of traffic delays or deviation of route by the ride giver. At block 410, the ad-hoc ride application continuously informs the ride takers of alternative ride givers who can give a ride in case the ride giver is stuck in traffic or otherwise is in risk of not being able to give a ride. The ride taker may choose an alternative ride giver suggested by ad-hoc ride application. At block 412, the ride giver arrives and the ride taker informs the ad-hoc ride application that he is no longer interested in a ride.

Figure 5:
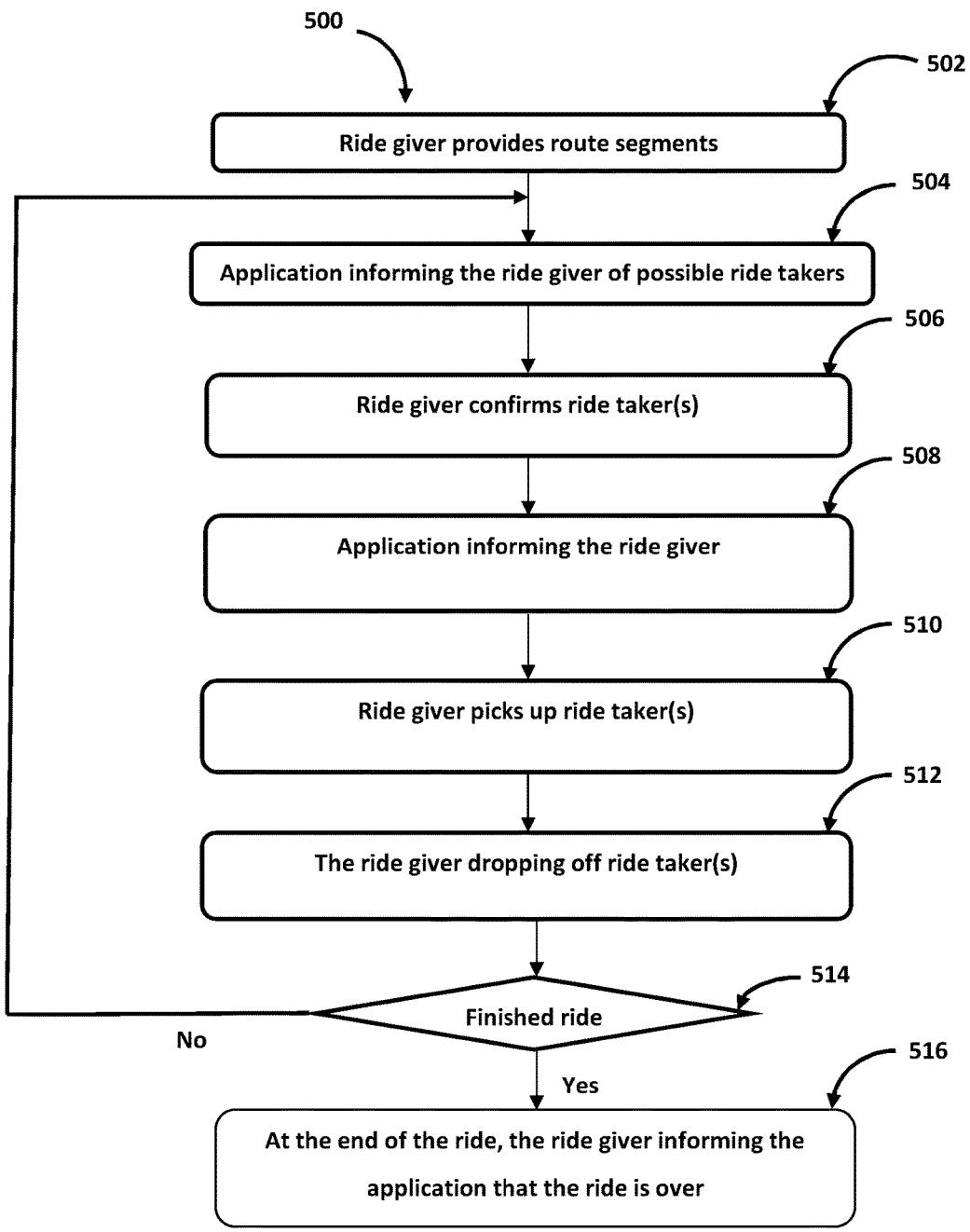
FIG. 5 is a flowchart of an ad-hoc ride sharing application from point of view of a ride giver, in accordance with an embodiment of the present subject matter.

Referring to FIG. 5, a method 500 for the ad-hoc ride sharing application from point of view of a ride giver is illustrated, in accordance with an embodiment of the present subject matter. At block 502, the ride giver provides route segments that he/she will be traversing in order. The ride giver also specifies his vehicle type. At block 504, the ad-hoc application informs the ride giver of possible ride takers. At block 506, the ride giver confirms ride taker. At block 508, the application informs the ride giver if a ride taker has changed his/her plan. At block 510, the ride giver picks up ride taker. At block 512, the ride giver drops off ride taker. At block 514, a determination is made whether the ride has finished. If ride has finished, the ride giver informs the ad-hoc ride application that the ride is over (block 516). If the ride has not finished, the ad-hoc ride application informs the ride giver of possible ride takers.

Figure 6:
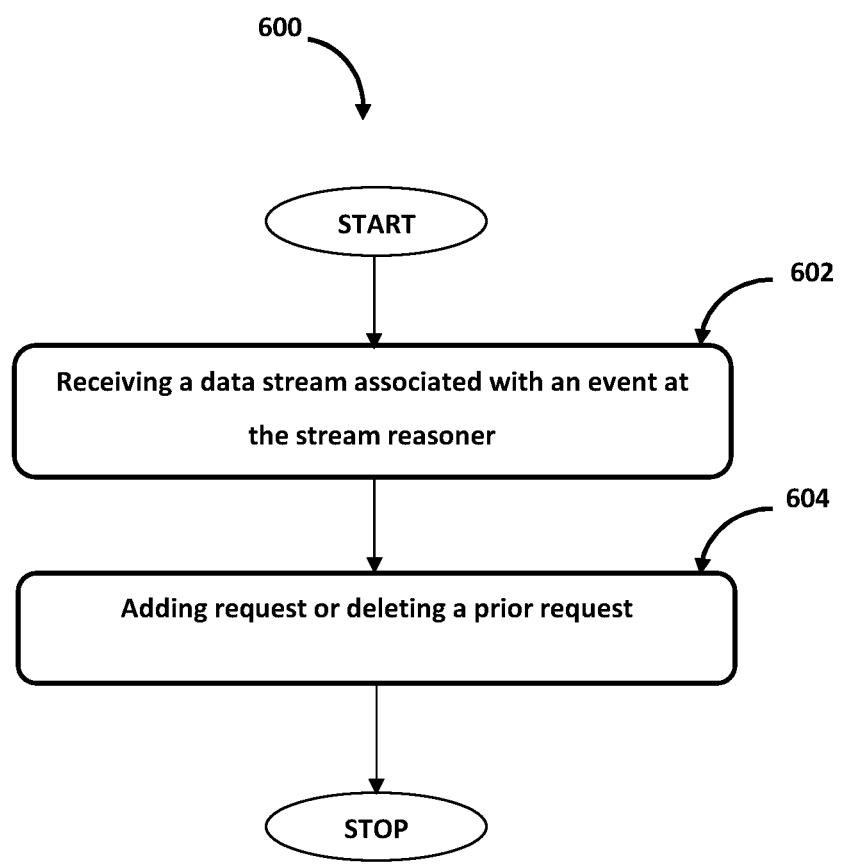
FIG. 6 is a flowchart that illustrates a method for stream reasoning, in accordance with an embodiment of the present subject matter.

Referring to FIG. 6, a method 600 of stream reasoning is illustrated. At block 602, a data stream associated with an event is received. The data stream provides factual information about the event. The data stream comprises a request and wherein the request is one of an add request and a delete request.

At block 604, the request is added or deleted from a memory based upon a type of the request. The method of adding and deleting a request is explained in detail above.

Some Advantages of the Stream Reasoner 102

The present subject matter provides client-managed windows; some applications such as the ad-hoc ride sharing application requires client-managed windows in addition to time-based and count-based windows, since duration of a request to a stream reasoner 102 is only known to the application 304.

The present subject matter provides execution of query fragments in parallel and sequence and combination of the results of these query fragments to achieve high level of performance.

The present subject matter provides support for heterogeneous knowledge sources, since, in enterprise environments, knowledge lies in different systems such as relational databases, flat files, RDF store etc.

The present subject matter processes incremental queries, wherein the impact of an event is considered separately from other events. The state of the intermediate applications is updated incrementally by results of the incremental query, thus reducing the running time of the query.

The present subject matter provides addition of knowledge packets to the stream reasoner 102 all at once rather than one by one, thus preventing partial requests to be added. The knowledge packet (set of triples) is also processed in a group.

Although implementations for methods and systems for reasoning and running queries over data streams have been described in language specific to structural features and/or methods, it is to be understood that the appended claims are not necessarily limited to the specific features or methods described. Rather, the specific features and methods are disclosed as examples of implementations for a system and a method for reasoning and running queries over data streams.

We claim:

1. A stream reasoner comprising:
a hardware processor; and
a memory coupled to the processor, wherein the processor is capable of executing instructions stored in the memory, the instructions comprising instructions to:
receive a data stream associated with an event from an intermediate application, being a state machine comprising a set of states, positioned between a user device and the stream reasoner, wherein the data stream provides a time-ordered set of facts about the event, and wherein the data stream comprises a request, and a type of the request is determined as one of an add request and a delete request based on a knowledge packet associated with the data stream received from the intermediate application; and in response to determining that the request is the add request, insert the request associated with the event; and in response to determining that the request is the delete request, delete a prior request associated with the event from the memory, wherein a state of a window, representing at least an order of all received requests, corresponding to the add request or the delete request is updated by an application management window module in the stream reasoner, wherein the instructions are further configured to:

receive a plurality of incremental queries, wherein each incremental query corresponds to a single event and assesses one single event at a time, wherein the plurality of incremental queries is supported by parameterized queries to run each incremental query multiple times with different parameterized values;

provide a logical reasoning about the event from the data stream and background knowledge using a set of rules, wherein the background knowledge supplements additional static information associated with the event;

execute the plurality of incremental queries on the logical reasoning, the data stream, and background knowledge, wherein a corresponding state of the intermediate application is updated incrementally with results of the executed plurality of incremental queries; and combine the results of the executed plurality of incremental queries with the background knowledge to detect patterns associated with the event.

2. The stream reasoner of claim 1, the instructions are further configured to:

configure additional sources to determine the background knowledge corresponding to the data stream.

3. The stream reasoner of claim 2, wherein the additional sources are heterogeneous knowledge sources.

4. The stream reasoner of claim 1, wherein an expiration of the request is dependent on at least one of time, count, and the type of request.

5. The stream reasoner of claim 1, wherein the logical reasoning is provided based upon a reasoning technique comprising one or more of a logical reasoning, a deductive reasoning, a rule-based reasoning, an inductive reasoning, and an abductive reasoning.

6. The stream reasoner of claim 1, the instructions are further configured to:

receive query fragments for the reasoning, the data stream, and the background knowledge;

execute the query fragments simultaneously on the reasoning, the data stream, and the background knowledge; and determine a final result based upon the execution of the query fragments.

7. The stream reasoner of claim 6, the instructions are further configured to:

execute the query fragments in one of a parallel mode and a sequential mode.

8. The stream reasoner of claim 1, wherein the knowledge packet is organized as a set of triples, and wherein each triple comprises a subject, a predicate, and an object, wherein the inserting the request corresponds to inserting the set of triples in the request for addition to the memory, wherein the delete request corresponds to deleting the knowledge packet immediately from the memory or schedule the knowledge packet for deletion from the memory.

9. A method, implemented by at least one computing device, for controlling a request in a stream reasoner, comprising:

receiving a data stream associated with an event from an intermediate application, being a state machine comprising a set of states, positioned between a user device and the stream reasoner, wherein the data stream provides a time-ordered set of facts about the event, and wherein the data stream comprises a request, and a type of the request is determined as one of an add request and a delete request based on a knowledge packet associated with the data stream received from the intermediate application;

in response to determining that the request is the add request, inserting the request associated with the event; and in response to determining that the request is the delete request, deleting a prior request associated with the event from the memory, wherein a state of a window, representing at least an order of all received requests, corresponding to the add request or the delete request is updated by an application management window module in the stream reasoner, wherein the method further comprising:

receiving a plurality of incremental queries, wherein each incremental query corresponds to a single event and assesses one single event at a time, wherein the plurality of incremental queries is supported by parameterized queries to run each incremental query multiple times with different parameterized values;

providing a logical reasoning about the event from the data stream and background knowledge using a set of rules, wherein the background knowledge supplements additional static information associated with the event;

executing the plurality of incremental queries on the logical reasoning, the data stream, and background knowledge, wherein a corresponding state of the intermediate application is updated incrementally with results of the executed plurality of incremental queries; and combining the results of the executed plurality of incremental queries with the background knowledge to detect patterns associated with the event.

10. The method of claim 9, further comprising:
configuring additional sources to determine the background knowledge corresponding to the data stream.

11. The method of claim 10, wherein the additional sources are heterogeneous knowledge sources.

12. The method of claim 9, wherein an expiration of the request is dependent on at least one of time, count, and the type of request.

13. The method of claim 9, wherein the reasoning is provided based upon a reasoning technique comprising one or more of a logical reasoning, a deductive reasoning, a rule-based reasoning, an abductive reasoning, and an inductive reasoning.

14. The method of claim 9, further comprising:

receiving query fragments for the reasoning, the data stream, and the background knowledge;

executing the query fragments simultaneously on the reasoning, the data stream, and the background knowledge; and determining a final result based upon summation of the result of the execution of the query fragments.

15. The method of claim 14, wherein the query fragments are executed in one of a parallel mode and a sequential mode.

16. The method of claim 9, wherein the knowledge packet is organized as a set of triples, and wherein each triple comprises a subject, a predicate, and an object, wherein the inserting the request corresponds to inserting the set of triples in the request for addition to the memory, wherein the delete request corresponds to deleting the knowledge packet immediately from the memory or schedule the knowledge packet for deletion from the memory.

17. The method of claim 9, further comprising processing the data stream using a combination of a reasoning technique and a plurality of queries, wherein the reasoning technique comprises at least one of a logical reasoning, a deductive reasoning, a rule-based reasoning, an abductive reasoning, and an inductive reasoning.

18. A computer program product having stored thereon instructions embodied in a non-transitory computer-readable medium for controlling a request in a stream reasoner, the instructions for:
   receiving a data stream associated with an event from an intermediate application, being a state machine comprising a set of states, positioned between a user device and the stream reasoner, wherein the data stream provides a time-ordered set of facts about the event, and wherein the data stream comprises a request, and a type of the request is determined as one of an add request and a delete request based on a knowledge packet associated with the data stream received from the intermediate application;
   in response to determining that the request is the add request, inserting the request associated with the event; and
   in response to determining that the request is the delete request, deleting a prior request associated with the event from the memory, wherein a state of a window, representing at least an order of all received requests, corresponding to the add request or the delete request is updated by an application management window module in the stream reasoner, wherein the instructions further comprising:
     receiving a plurality of incremental queries, wherein each incremental query corresponds to a single event and assesses one single event at a time, wherein the plurality of incremental queries is supported by parameterized queries to run each incremental query multiple times with different parameterized values;
     providing a logical reasoning about the event from the data stream and background knowledge using a set of rules, wherein the background knowledge supplements additional static information associated with the event;
     executing the plurality of incremental queries on the logical reasoning, the data stream, and background knowledge, wherein a corresponding state of the intermediate application is updated incrementally with results of the executed plurality of incremental queries; and
     combining the results of the executed plurality of incremental queries with the background knowledge to detect patterns associated with the event.

* * * * *